United States Patent
McCloud

(10) Patent No.: US 8,514,689 B2
(45) Date of Patent: Aug. 20, 2013

(54) INTERFERENCE REJECTION BY SOFT-WINDOWING CIR ESTIMATES BASED ON PER-TAP QUALITY ESTIMATES

(75) Inventor: Michael L. McCloud, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 265 days.

(21) Appl. No.: 13/035,298

(22) Filed: Feb. 25, 2011

(65) Prior Publication Data

US 2011/0211470 A1    Sep. 1, 2011

Related U.S. Application Data

(60) Provisional application No. 61/308,785, filed on Feb. 26, 2010.

(51) Int. Cl.
  *H04J 11/00*      (2006.01)
(52) U.S. Cl.
  USPC .......................................................... 370/206
(58) Field of Classification Search
  None
  See application file for complete search history.

(56) References Cited

U.S. PATENT DOCUMENTS

| | | | |
|---|---|---|---|
| 5,844,946 A * | 12/1998 | Nagayasu | 375/341 |
| 2002/0057752 A1 * | 5/2002 | Denno | 375/346 |
| 2006/0209974 A1 * | 9/2006 | Yoshida | 375/260 |
| 2007/0110201 A1 | 5/2007 | Mergen et al. | |

FOREIGN PATENT DOCUMENTS

| | | |
|---|---|---|
| EP | 1830529 A1 | 9/2007 |
| WO | 2007135400 A1 | 11/2007 |

OTHER PUBLICATIONS

International Search Report and Written Opinion—PCT/US2011/026386, ISA/EPO—Jun. 24, 2011.

* cited by examiner

*Primary Examiner* — Raj Jain
(74) *Attorney, Agent, or Firm* — Stanton Braden

(57) ABSTRACT

A channel impulse response (CIR) estimate associated with a communication channel may be processed by determining coefficient values that respectively correspond to taps of the CIR estimate, and multiplying the taps by the respectively corresponding coefficient values. The coefficient values are determined according to a soft decision technique. The resulting modified CIR estimate is used to demodulate a communication signal received via the communication channel.

16 Claims, 2 Drawing Sheets

INTERFERENCE REJECTION BY SOFT-WINDOWING CIR ESTIMATES BASED ON PER-TAP QUALITY ESTIMATES

CLAIM OF PRIORITY UNDER 35 U.S.C. §119

The present Application for Patent claims priority to Provisional Application No.61/308,785 entitled "INTERFERENCE REJECTION BY SOFT-WINDOWING CIR ESTIMATES BASED ON PER-TAP QUALITY ESTIMATES", filed Feb. 26, 2010, and assigned to the assignee hereof and hereby expressly incorporated by reference herein.

BACKGROUND

1. Field

The present work relates generally to communications and, more particularly, to estimating the channel impulse response (CIR) of a communication channel, for use as a demodulation reference.

2. Background

A typical problem in a communications system (whether wireless or wired) is estimating the impulse response of the communication channel linking the transmitting device to the receiving device. This channel may include radio frequency filters and distortion sources in the transmitter and receiver, as well as the actual propagation medium (whether wireless or wired) over which the communication signal travels. As is well-known in the art, when estimated in the discrete time domain, the CIR estimate may be denoted by $$\hat{h}(n;m)=h(n;m)+u(n;m) \quad (1)$$

where h(n;m) is the true (complex valued) CIR at lag n and update time m, with power $\sigma_h^2(n)$, and where u(n;m) is additive noise with power $\sigma_u^2(n)$.

When the resulting estimated CIR is used as a reference for demodulating data in the receiver, the additive noise u(n; m) adversely affects the receiver performance and hence limits the data transmission reliability and throughput. To mitigate this noise, conventional systems commonly filter the CIR estimates across updates of the sample (i.e. time) domain estimator to form a low pass filtered CIR estimate $\hat{h}^f(n;m)$, and then apply a threshold to each tap of that filtered CIR estimate (based on the tap magnitude or squared magnitude), in order to force "weak" taps to zero.

The thresholding ensures that taps that have very little signal component (and are hence essentially pure noise) have minimum affect on the final performance. One complication with this approach is choosing the threshold value. In particular, at low carrier-to-interference-plus-noise ratios (CINRs), it is beneficial to zero out the majority of the taps (i.e., choose a low threshold) since the noise is the chief contributor to the overall performance. On the other hand, as the noise level drops, the information in the "weak" CIR taps becomes more important for operation at high spectral efficiencies. The problem is to process the raw estimates correctly under all operating conditions to efficiently extract the maximum information for use in data demodulation. In general, the choice of the threshold value should preferably be matched to the operating environment.

The thresholding approach requires considerable oversight in order to handle/manage different extreme (and time-varying) channel conditions. A further complication arises because the thresholding approach can result in spectral regrowth in the frequency domain channel response, which can be detrimental.

It is therefore desirable in view of the foregoing to provide for time domain CIR estimation that mitigates the effects of additive noise on receiver performance and while avoiding the aforementioned difficulties associated with conventional filtering/thresholding approaches.

SUMMARY

A CIR estimate associated with a communication channel may be processed by determining coefficient values that respectively correspond to taps of the CIR estimate, and multiplying the taps by the respectively corresponding coefficient values. The coefficient values are determined according to a soft decision technique. The resulting modified CIR estimate is used to demodulate a communication signal received via the communication channel.

BRIEF DESCRIPTION OF THE DRAWINGS

Various aspects of a wireless communications system are illustrated by way of example, and not by way of limitation, in the accompanying drawings, wherein.

DETAILED DESCRIPTION

Example embodiments of the present work provide a data-directed approach that tends to ensure that "good" taps are kept and poor quality estimates are de-emphasized. Some embodiments implement a "windowing" operation that multiplies the taps of a conventional low pass filtered CIR estimate by respectively corresponding non-negative window coefficients to reject interference and clean up the estimate, resulting in a modified (or "windowed") CIR estimate. The window coefficients (also referred to herein simply as coefficients) are matched to the estimated quality of each tap through the assistance of noncoherent filtering. The windowing technique is relatively simple, and automatically calibrates itself to the operating quality of the link on a tap by tap basis, thus avoiding complex oversight algorithms. Some embodiments maintain a state of optimality (in the mean squared error sense) under all conditions.

In some embodiments, the output of the windowing operation, i.e. a windowed CIR estimate, is given by:

$$\hat{h}^w(n;m)=w(n)\hat{h}^f(n;m). \quad (2)$$

This windowed CIR estimate is then used as the demodulation reference in conventional fashion. Note that the window function w(n) is a function of only the tap number n. In various embodiments, the window coefficients are quantized to as few bits as desired. At the extreme, one bit quantization leads to the aforementioned situation of choosing the threshold value to match CINR.

The window coefficients are calculated based on low pass filtered values of Signal Energy, $E_S(n;m)$, and low pass filtered values of Signal-Plus-Noise Energy, $E_{SPN}(n;m)$. This is shown, for some embodiments, in the CIR estimate processing portion illustrated diagrammatically in FIG. 1. The illustrated processing portion may be provided, for example, in a CIR estimation unit of a communication receiver. The aforementioned energy values are calculated as shown, based on the CIR estimate $\hat{h}(n;m)$ (see also equation 1). In various embodiments, the coefficients of the low pass filters (LPFs) may differ, because the noncoherent estimates, produced by LPFs 12 and 13 in FIG. 1, are generally meant to be long-term averages, whereas the LPF 11 in FIG. 1 produces coherently filtered CIR estimates which are, in some embodiments, tuned to the channel Doppler frequency.

Figure 1:
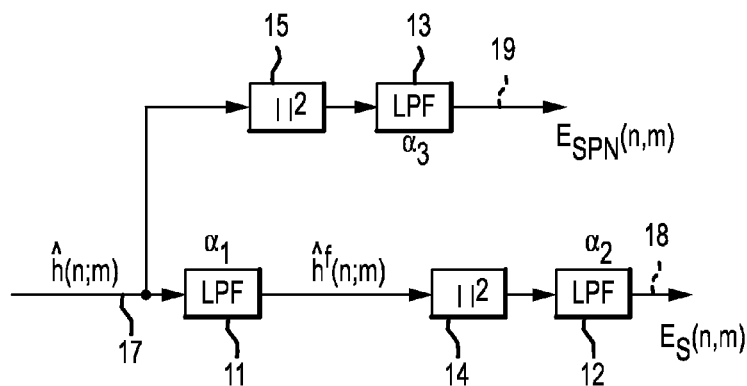
FIG. 1 diagrammatically illustrates a portion of a CIR estimate processing section of a wireless communication receiver according to exemplary embodiments of the present work.

In the architecture of FIG. 1, the total time delay through the Signal-Plus-Noise energy (upper) branch should match the total time delay through the Signal Energy (lower) branch. In some embodiments, this is readily achieved by designing such that the throughput delay of LPF 13 is equal to the total of the throughput delays of LPFs 11 and 12, assuming approximately equal delays through the magnitude squaring elements 14 and 15 that respectively precede the LPFs 12 and 13 in the respective processing branches of FIG. 1. For example, some embodiments adjust LPF group delay by suitably adjusting filter parameters (which are discussed below), while others simply insert suitable delay elements.

In some embodiments, the window values defined by w(n) are computed from a simple minimum mean-squared error-design criterion. For a given filter tap, the window value corresponding to tap n is found from:

$$w(n) = \underset{w}{\operatorname{argmin}} E\left\{|h(n; m) - w(n)\hat{h}(n; m)|^2\right\} \quad (3)$$

$$= \underset{w}{\operatorname{argmin}} E\{|h(n; m) - w(m)(h(n; m) + u(n; m))|^2\}$$

$$= \frac{\sigma_h^2(n)}{\sigma_h^2(n) + \sigma_u^2(n)}$$

where the additive noise u(n;m) is assumed to be uncorrelated to the actual channel tap.

In some embodiments, the LPF 11 is a single tap IIR filter with an output for a particular CIR tap n and update time m given by:

$$\hat{h}^f(n;m) = (1-\alpha)\hat{h}^f(n;m-1) + \alpha\hat{h}(n;m). \quad (4)$$

In some embodiments, the LPFs 12 and 13 are also IIR filters of this type.

The parameter α from equation (4) may vary among the LPFs 11-13 such that LPF 11 has $\alpha_1$, LPF 12 has $\alpha_2$, and LPF 13 has $\alpha_3$, as shown in FIG. 1. In some embodiments, at least one of the transmitter and receiver is movable (e.g., carried in a motor vehicle), and the LPF 11 is tuned to the Doppler frequency such that $\alpha_1$ asymptotically approaches 1 and 0 as the Doppler frequency respectively increases (higher vehicular speed) and decreases (lower vehicular speed). LPFs 12 and 13 perform longer term averaging, so $\alpha_2$ and $\alpha_3$ will therefore tend to vary inversely with the size of the time window used for the averaging. For example, in some movable receiver embodiments, the averaging time window increases in size with decreasing receiver (e.g., vehicle) speed. In various embodiments, the specific values of $\alpha_1$-$\alpha_3$ are readily determined by empirical observation of performance under expected operating conditions.

Various embodiments use various forms of IIR and/or FIR filters in various combinations at 11-13 in FIG. 1 to achieve the aforementioned low pass filtering objectives.

Assuming the channel is time-invariant, and recalling that $\hat{h}(n;m) = h(n;m) + u(n;m)$, it can readily be shown that the noncoherent (Signal Energy) filter input (and output) at LPF 12 in FIG. 1 has the following expectation:

$$E\left\{|\hat{h}^f(n;m)|^2\right\} = \sigma_h^2(n) + \frac{\alpha\sigma_u^2(n)}{2-\alpha} \quad (5)$$

$$= \sigma_h^2(n) + \beta\sigma_u^2(n)$$

In equation (5) above, $$\beta = \frac{\alpha}{2-\alpha},$$

with $\alpha = \alpha_1$ $(_{of\,LPF\,11})$.

Similarly, the Signal-Plus-Noise filter output at LPF 13 in FIG. 1 has expectation:

$$E\{|\hat{h}(n;m)|^2\} = \sigma_h^2(n) + \sigma_u^2(n) \quad (6)$$

The desired window tap may be computed as:

$$w(n) = \frac{E_S(n, m) - \beta E_{SPN}(n, m)}{(1 - \beta)E_S(n, m)}. \quad (7)$$

It can be seen that w(n) approaches 1 as $E_{SPN}$ approaches $E_S$. This tends to match the w(n) value to the quality of the associated tap, thereby automatically emphasizing relatively higher CINR taps and de-emphasizing relatively lower CINR taps.

Figure 2:
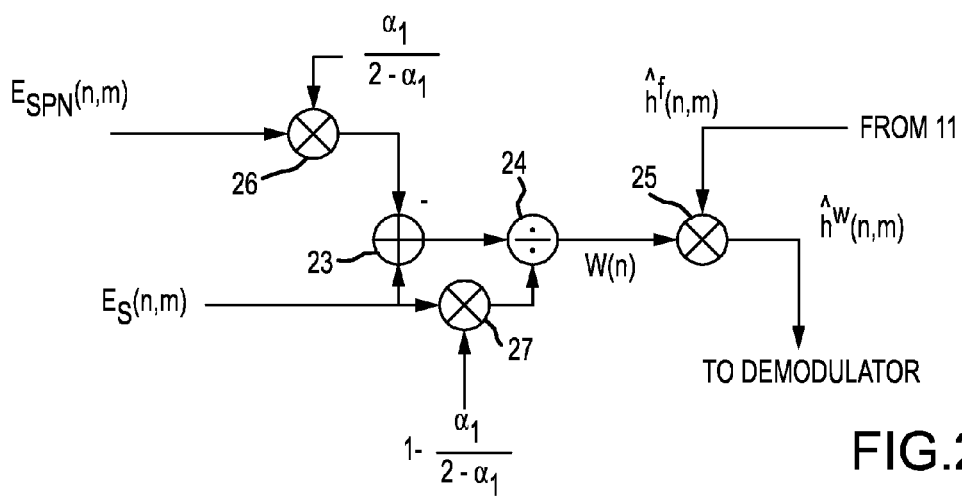
FIG. 2 diagrammatically illustrates a further portion of the CIR estimate processing section of FIG. 1 according to exemplary embodiments of the present work.

FIG. 2 diagrammatically illustrates a further CIR estimate processing portion according to exemplary embodiments of the present work. This further CIR estimate processing portion may be provided, for example, in a CIR estimation unit of a communication receiver, together with the CIR estimate processing portion of FIG. 1. In some embodiments, this architecture is capable of implementing equation (7). The processing portion of FIG. 2 receives inputs from the processing portion of FIG. 1, namely, the filtered CIR estimate $\hat{h}^f(n;m)$, and the energy measures $E_S(n;m)$ and $E_{SPN}(n;m)$. The processing portion of FIG. 2 also utilizes the parameter $\alpha_1$ associated with LPF 11 of FIG. 1. Multiplying elements 26 and 27, summing element 23 and dividing element 24 cooperate for combining the input energy measures with the illustrated functions of $\alpha_1$ to implement equation (7), thereby producing the desired window coefficients w(n). Multiplying element 25 multiplies the window coefficients w(n) by the respectively corresponding taps of the filtered CIR estimate $\hat{h}^f(n;m)$ to produce the modified (or "windowed") CIR estimate, $\hat{h}^w(n;m) = w(n)\hat{h}^f(n;m)$. This windowed CIR estimate is then provided to a demodulation unit for conventional use as a demodulation reference.

Some embodiments compute multiple values for each of $E_s$ and $E_{SPN}$, which multiple values are respectively associated with multiple CIR estimates for multiple communication links. The multiple $E_s$ values are averaged, as are the multiple $E_{SPN}$ values, to produce averages for $E_s$ and $E_{SPN}$. These $E_s$ and $E_{SPN}$ averages are used to compute a single composite window function for use with all of the multiple CIR estimates. In such embodiments, the input 17 in FIG. 1 provides multiple CIR estimates respectively associated with multiple communication channels, and each processing branch shown in FIG. 1 represents multiple branches (one for each CIR estimate). Each set of multiple $E_s$ values and each set of multiple $E_{SPN}$ values is averaged (shown by broken lines at 18 and 19 in FIG. 1) to produce the $E_s$ and $E_{SPN}$ averages, which are then used as the left-side inputs in FIG. 2.

Figure 3:
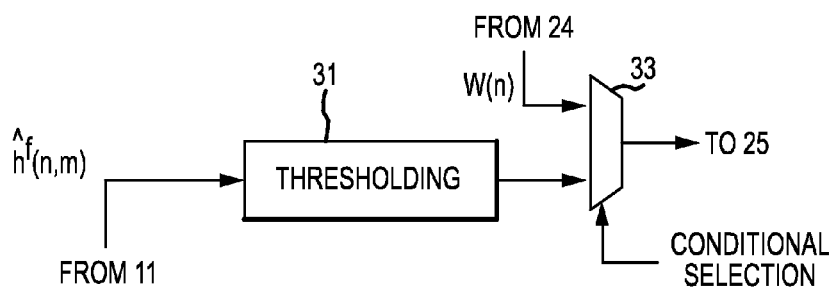
FIG. 3 diagrammatically illustrates a conditionally selective hard threholsding capability according to exemplary embodiments of the present work.

Some embodiments use hard thresholding as a function of the estimated delay spread in conjunction with the Doppler frequency. As the Doppler frequency increases and/or after a filter state reset, the energy estimates $E_S(n;m)$ and $E_{SPN}(n;m)$ are relatively unreliable. Accordingly, and as shown in FIG. 3, a selective hard thresholding capability may be incorporated into the architecture of FIG. 2, so that conventional hard thresholding (where w(n) is either 0 or a predetermined full scale value such as 1), as shown at 31, may be selected, as shown at 33, under the aforementioned (or other suitable) conditions. As an example, some embodiments select hard threhsolding when the Doppler frequency increases to a triggering frequency of 500 Hz. The hard thresholding mode is distinguished from the "soft" windowing mode described above relative to FIGS. 1 and 2, where it can be seen that the window coefficients may have various values other than 0 and 1 (or other full scale value), so long as the applicable quantization is greater than one bit.

Figure 4:
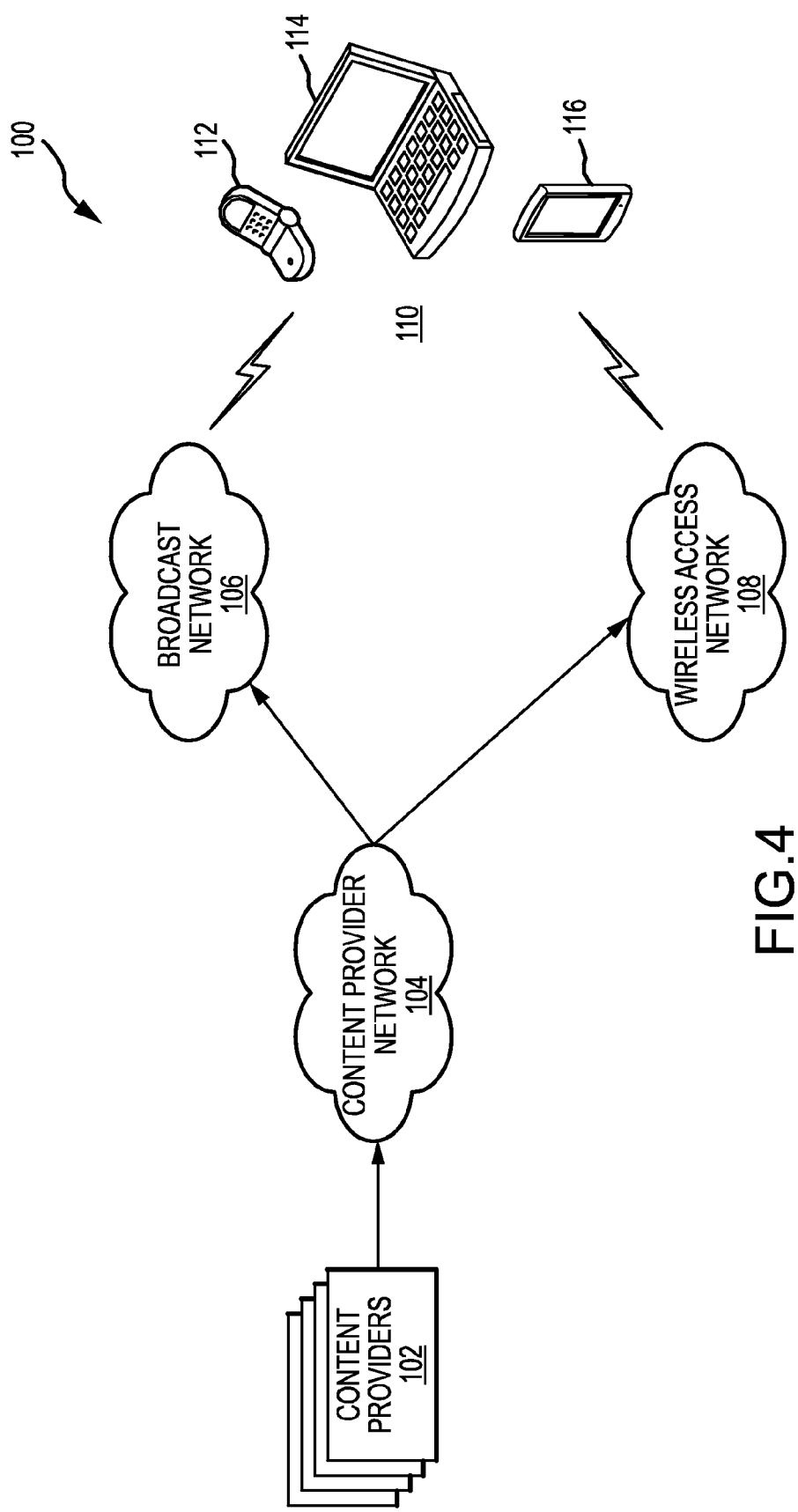
FIG. 4 diagrammatically illustrates an example of a communication system in which exemplary embodiments of the present work may be implemented.

FIG. 4 diagrammatically illustrates an example OFDM wireless communications system 100 in which the present work may be implemented. In general, the system 100 creates and broadcasts multimedia content across various networks to a large number of mobile subscribers. The communications system 100 includes any number of content providers 102, a content provider network 104, a broadcast network 106, and a wireless access network 108. The communications system 100 is also shown with a number of devices 110 used by mobile subscribers to receive multimedia content. These devices 110 include a mobile telephone 112, a personal digital assistant (PDA) 114, and a laptop computer 116. The devices 110 illustrate just some of the devices that are suitable for use in the communications systems 100. It should be noted that although three devices are shown in FIG. 4, virtually any number of analogous devices or types of devices are suitable for use in the communications system 100, as would be apparent to those skilled in the art. In some embodiments, techniques such as described above relative to FIGS. 1-3 are implemented in a CIR estimation unit of at least one of the devices 110.

The content providers 102 provide content for distribution to mobile subscribers in the communications system 100. The content may include video, audio, multimedia content, clips, real-time and non real-time content, scripts, programs, data or any other type of suitable content. The content providers 102 provide content to the content provider network for wide-area or local-are distribution.

The content provider network 104 comprises any combination of wired and wireless networks that operate to distribute content for delivery to mobile subscribers. In the example illustrated in FIG. 4, the content provider network 104 distributes content through a broadcast network 106. The broadcast network 106 comprises any combination of wired and wireless proprietary networks that are designed to broadcast high quality content. These proprietary networks may be distributed throughout a large geographic region to provide seamless coverage to mobile devices. Typically, the geographic region will be divided into sectors with each sector providing access to wide-area and local-area content.

The content provider network 104 may also include a content server (not shown) for distribution of content through a wireless access network 108. The content server communicates with a base station controller (BSC) (not shown) in the wireless access network 108. The BSC may be used to manage and control any number of base transceiver station (BTSs) (not shown) depending on the geographic reach of the wireless access network 108. The BTSs provide access to wide-area and local-area for the various devices 110.

The multimedia content broadcast by the content providers 102 include one or more services. A service is an aggregation of one or more independent data components. Each independent data component of a service is called a flow. By way of example, a cable news service may include three flows: a video flow, an audio flow, and a control flow.

Services are carried over one of more logical channels. In FLO applications, a logical channel is often referred to as a Multicast Logical Channel (MLC). A logical channel may be divided into multiple logical sub-channels. These logical sub-channels are called streams. Each flow is carried in a single stream. The content for a logical channel is transmitted through the various networks in a physical frame. In FLO applications, the physical frame is often referred to as a superframe.

The air interface used to transmit the physical frames to the various devices 110 shown in FIG. 4 may vary depending on the specific application and the overall design constraints. In general, communication systems that employ such technologies as FLO or the 3gpp LTE standard utilize Orthogonal Frequency Division Multiplexing (OFDM), which is also utilized by Digital Audio Broadcasting (DAB), Terrestrial Digital Video Broadcasting (DVB-T), WiMax, WIFI, and Terrestrial Integrated Services Digital Broadcasting (ISDB-T). OFDM is a multi-carrier modulation technique that effectively partitions the overall system bandwidth into multiple (N) sub-carriers. These sub-carriers, which are also referred to as tones, bins, frequency channels, etc., are spaced apart at precise frequencies to provide orthogonality. Content may be modulated onto the sub-carriers by adjusting each sub-carrier's phase, amplitude or both. Typically, quadrature phase shift keying (QPSK) or quadrature amplitude modulation (QAM) is used, but other modulation schemes may also be used.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present work.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use products that embody principles of the present work. Various modifications to these embodiments will be readily apparent to those skilled in the art, and the generic principles defined herein may be applied to other embodiments without departing from the spirit or scope of the disclosure. Thus, the present work is not intended to be limited to the embodiments shown herein but is to be accorded the widest scope consistent with the principles and novel features disclosed herein.

What is claimed is:

1. A method of processing a channel impulse response (CIR) estimate associated with a communication channel, comprising:
    determining coefficient values that respectively correspond to taps of the CIR estimate, wherein at least one of said coefficient values is between zero and a full scale value;
    multiplying said taps by the respectively corresponding coefficient values to produce a modified CIR estimate; and
    providing the modified CIR estimate for use in demodulating a communication signal received via the communication channel;
    wherein said determining includes determining first and second energy measures associated with the communication channel, and determining said coefficient values based on said first and second energy measures, wherein said first energy measure is indicative of signal energy associated with the communication channel, and said second energy measure is indicative of signal-plus-noise energy associated with the communication channel.

2. The method of claim 1, including receiving an initial CIR estimate associated with the communication channel, applying a noise filtering operation to said initial CIR estimate to produce said CIR estimate, determining said first energy measure based on said CIR estimate, and determining said second energy measure based on said initial CIR estimate.

3. The method of claim 2, wherein said determining said first energy measure includes successively applying magnitude squaring and low-pass filtering operations to said CIR estimate, and wherein said determining said second energy measure includes successively applying magnitude squaring and low-pass filtering operations to said initial CIR estimate.

4. The method of claim 3, wherein each of the noise filtering and low-pass filtering operations includes a single tap filtering operation.

5. The method of claim 2, wherein said receiving includes receiving multiple said initial CIR estimates respectively associated with multiple communication channels, wherein said applying includes applying a noise filtering operation to each of said multiple initial CIR estimates to produce multiple said CIR estimates, wherein said determining said first energy measure includes determining said first energy measure based on said multiple CIR estimates, and wherein said determining said second energy measure includes determining said second energy measure based on said multiple initial CIR estimates.

6. The method of claim 3, wherein each of the noise filtering and low-pass filtering operations includes one of an infinite impulse response filtering operation and a finite impulse response filtering operation.

7. The method of claim 1, including selectively substituting zero or said full scale value for each said coefficient value.

8. An apparatus for processing a CIR estimate associated with a communication channel, comprising:
    a processing portion configured to determine coefficient values that respectively correspond to taps of the CIR estimate, wherein at least one of said coefficient values is between zero and a full scale value, said processing portion further configured to multiply said taps by the respectively corresponding coefficient values to produce a modified CIR estimate; and
    an output coupled to said processing portion for providing the modified CIR estimate for use in demodulating a communication signal received via the communication channel;
    wherein said processing portion is configured to determine said coefficient values based on first and second energy measures, wherein said first energy measure is indicative of signal energy associated with the communication channel, and said second energy measure is indicative of signal-plus-noise energy associated with the communication channel.

9. The apparatus of claim 8 wherein said processing portion includes an input for receiving an initial CIR estimate associated with the communication channel, and wherein said processing portion is configured to apply a noise filtering operation to said initial CIR estimate to produce said CIR estimate, to determine said first energy measure based on said CIR estimate, and to determine said second energy measure based on said initial CIR estimate.

10. The apparatus of claim 9, wherein said processing portion is configured to successively apply magnitude squaring and low-pass filtering operations to both said CIR estimate and said initial CIR estimate to produce, respectively, said first and second energy measures.

11. The apparatus of claim 10, wherein each of the noise filtering and low-pass filtering operations includes a single tap filtering operation.

12. The apparatus of claim 9, wherein said input receives multiple said initial CIR estimates respectively associated with multiple communication channels, and wherein said processing portion is configured to apply a noise filtering operation to each of said multiple initial CIR estimates to produce multiple said CIR estimates, to determine said first energy measure based on said multiple CIR estimates, and to determine said second energy measure based on said multiple initial CIR estimates.

13. The apparatus of claim 10, wherein each of the noise filtering and low-pass filtering operations includes one of an infinite impulse response filtering operation and a finite impulse response filtering operation.

14. The apparatus of claim 8, wherein said processing portion is configured to selectively substitute zero or said full scale value for each said coefficient value.

15. An apparatus for processing a CIR estimate associated with a communication channel, comprising:
  means for determining coefficient values that respectively correspond to taps of the CIR estimate, wherein at least one of said coefficient values is between zero and a full scale value;
  means for multiplying said taps by the respectively corresponding coefficient values to produce a modified CIR estimate; and
  means for providing the modified CIR estimate for use in demodulating a communication signal received via the communication channel;
  wherein said means for determining includes means for determining first and second energy measures associated with the communication channel, and means for determining said coefficient values based on said first and second energy measures, wherein the first energy measure is a measure indicative of signal energy associated with the communication channel, and the second energy measure is a measure indicative of signal-plus-noise energy associated with the communication channel.

16. A computer program product that supports processing a CIR estimate associated with a communication channel, comprising:
  a computer-readable medium comprising:
  code for causing at least one data processor to determine coefficient values that respectively correspond to taps of the CIR estimate, wherein at least one of said coefficient values is between zero and a full scale value;
  multiplying said taps by the respectively corresponding coefficient values to produce a modified CIR estimate; and
  provide the modified CIR estimate for use in demodulating a communication signal received via the communication channel;
  wherein said code for causing the at least one data processor to determine coefficient values causes the at least one data processor to determine first and second energy measures associated with the communication channel, and to determine said coefficient values based on said first and second energy measures, wherein the first energy measure is a measure indicative of signal energy associated with the communication channel, and wherein the second energy measure is a measure indicative of signal-plus-noise energy associated with the communication channel.

* * * * *